3,092,676
ISOMERIZATION PROCESS
William P. Hettinger, Jr., Dolton, Ill., Carl D. Keith, Summit, N.J., and Walter F. Lorenc, Harvey, Ill., assignors, by mesne assignments, to Engelhard Industries, Inc., Newark, N.J., a corporation of Delaware
No Drawing. Filed May 2, 1960, Ser. No. 25,890
9 Claims. (Cl. 260—683.66)

Our invention relates to an improved method for the isomerization of alkanes in order to introduce branching into their structure.

It has heretofore been proposed in the art to isomerize alkanes, thereby increasing their utility as gasoline components or for other purposes. Thus, when isobutane is produced by the isomerization of normal butane, the isobutane can be utilized as a gasoline constituent or it can be employed as a part of the charge stock to an alkylation unit. Isopentane and isohexane, produced by the isomerization of normal pentane and normal hexane, respectively, also represent improved gasoline components, when compared with the materials from which they are produced. Various methods have heretofore been proposed in the art for the isomerization of alkanes in order to introduce branching into their structure, and such methods have involved the use of catalysts such as aluminum halides including aluminum chloride or aluminum bromide or sulfur acids including sulfuric acid, ethane sulfonic acid, chlorosulfonic acid and fluorosulfonic acid. Hydrogenation catalysts have also been proposed, including platinum-alumina-combined halogen catalysts; nickel, cobalt or platinum supported on silica-alumina; and molybdenum or tungsten oxide on silica-alumina and molybdenum oxide on alumina.

A process for the isomerization of alkanes in order to introduce branching into their structure must meet at least two requirements. In the first place, the process must result in a relatively high conversion of the alkane to other materials so that an undue amount of the alkane does not pass through the reaction system unchanged. At the same time, the conversion reaction must be selective, that is, a relatively large proportion of the alkane converted must be converted into products which have the same number of carbon atoms and which at the same time have an increased degree of branching in the carbon structure.

In accordance with out invention, we have discovered that catalysts which consist essentially of rhodium supported on alumina are particularly effective for use in the isomerization of alkanes in order to introduce branching into their structure. The rhodium-alumina catalyst utilized, must, however, be sulfided prior to being used in the conversion reaction or otherwise, we have found, excessive demethylation occurs. Demethylation results in the formation of methane, and this is undesirable inasmuch as methane is not a useful gasoline ingredient, as the art is well aware.

The catalyst utilized in accordance with our process is essentially rhodium supported on alumina. The amount of rhodium present in the catalyst can be varied considerably, but in general it will amount to from about 0.01 to about 2 percent by weight of the total catalyst composition. The catalyst base can be pure alumina or it can be alumina in admixture with minor amounts of other ingredients, particularly acidic promoters. Thus, in addition to the alumina, the catalyst base can contain combined halogen, particular chlorine or fluorine, in amount up to 8 percent by weight, but preferably about 0.1 to 3 percent by weight, or it can be composed of mixtures of alumina and one or more other metal oxides such as silica, magnesia, or boria, the total amount of such oxides generally not exceeding 35 percent by weight of the catalyst base, for instance, from about 0.1 or 5 to 15 or 20 weight percent. The rhodium-alumina catalyst which we use in our isomerization procedure can be prepared with the aid of a wide variety of sulfiding agents. Hydrogen sulfide is particularly effective for this purpose, but in its place there can be utilized other sulfiding agents, particularly carbon disulfide or alkyl mercaptans, such as those containing from 1 to 5 carbon atoms, for example, methyl mercaptan, ethyl mercaptan, normal propyl mercaptan, isopropyl mercaptan, normal butyl mercaptan. Dialkylmonosulfides and dialkyldisulfides, containing from 1 to 5 carbon atoms in each alkyl radical, can also be utilized as a sulfiding agent, among them being dimethylsulfide, dimethyldisulfide, diethylsulfide, diethyldisulfide, di-n-propylsulfide, di-n-propyldisulfide, and the like. The conditions under which the rhodium-alumina catalyst is subjected to the action of the sulfiding agent can also be varied widely in order to provide the catalyst which we utilize in accordance with our isomerization process, so that the sulfiding operation performed on the catalyst can be conducted at pressures within the range from 0 p.s.i.g. to 1000 p.s.i.g. or higher and at temperatures ranging from 70° F. to 1000° F., or higher.

The process of our invention is widely applicable to the isomerization of alkanes in order to introduce branching into their structure and thereby increase their utility as gasoline constituents or for other purposes. In general, however, the process of our invention is useful in isomerizing alkanes which contain from 4 to 12 carbon atoms, among such alkanes being normal heptane, normal octane, normal decane and normal dodecane. Our process has particular advantage, however, where the alkane feed contains from 4 to 6 carbon atoms, and is composed of normal butane, normal pentane, normal hexane, or mixtures thereof. In carrying out the isomerization process of our invention, a wide variety of reaction conditions can be utilized. In general, however, the isomerization will be carried out at an elevated temperature of about 650° F. to about 1000° F., an elevated pressure of about 50 p.s.i.g. to about 1000 p.s.i.g., a hydrogen to alkane molar ratio of about 0.5:1 to 20:1 and a weight hourly space velocity (weight units of alkane feed per weight unit of catalyst per hour) of about 0.5 to about 20.

In carrying out our isomerization process, it is not essential that the alkane fed to the reaction system be absolutely pure. Alkanes produced by conventional petroleum refinery operations can be employed as a feed in accordance with our process. Usually, however, the alkane feed will contain at least about 50 mole percent, and preferably at least about 80 mole percent, of alkane, preferably normal alkane, the remainder being hydrocarbons of similar boiling point. Also, the hydrogen utilized in the operation need not be absolutely pure, streams containing a high proportion of hydrogen such as are generally found in petroleum refinery operations being suitable for use in the process. Such streams will generally contain at least about 75 mole percent of hydrogen, the remainder being light hydrocarbons, such as methane, ethane, ethylene, propane, propylene and the like.

When the present process is carried out, the alkane undergoing isomerization is in vapor phase, and any of the methods conventionally employed in the art for contacting the reactant and catalyst can be utilized. Thus, the catalyst can be disposed in a fixed bed, in a moving bed, or in a fluidized bed, and the operation can be either batchwise or continuous. Alkane which passes through the reaction system unchanged can be recovered, if desired, and recirculated, recovery being effected by fractionation, selective adsorption and the like. Among the adsorbents which are particularly useful are crystalline sodium and calcium alumino-silicates, which have been heated to remove their water of hydration, resulting in the formation of crystals which are highly porous. Such crystalline silicates are commercially available materials and have pores of molecular dimensions, only about 15–20 billionths of an inch in diameter. Such silicates are effective for the purpose of separating straight-chain compounds from cyclic and branched-chain compounds due to the fact that the straight-chain molecules are small enough to enter the pores and be absorbed, while the cyclic and branched chain molecules are not.

*Example I*

5630 grams of an aqueous alumina hydrate slurry containing 650 grams of $Al_2O_3$ is first prepared by reacting ammonium hydroxide and aluminum chloride in aqueous admixture. The alumina hydrate content of the slurry is 66 percent by weight trihydrate, the slurry having been prepared in accordance with the teachings of application Serial No. 288,058, filed May 15, 1952, now abandoned, and its continuation-in-part application Serial No. 489,726, filed February 21, 1955, now U.S. Patent No. 2,838,444. The slurry is placed in a 3 gallon polyethylene jar fitted with a high-speed air-driven stirrer. To the slurry there is added 500 cc. of deionized water and the mixture is stirred 10 minutes. At this time the hydrate is well dispersed and the pH of the mixture is 9.1. In a 1500 ml. beaker there is prepared a mixture of 167 cc. of an aqueous solution of rhodium chloride equivalent to 2.6 grams of rhodium and 500 cc. of deionized water. This mixture is then added slowly over a period of 5 minutes to the stirred slurry of alumina hydrate. Stirring is continued for a period of 20 more minutes, at which point the pH of the mixture is 8.35. 9.50 grams of ammonium fluoride equivalent to 4.88 grams of fluorine is dissolved in 300 cc. of deionized water and the mixture is filtered. While the slurry of alumina hydrate is being stirred, the aqueous solution of ammonium fluoride is slowly added thereto over a period of 5 minutes, and after this has been done stirring is continued for an additional 20 minutes. At this point, the slurry is fairly thick, is homogeneous pink in color and has a pH of 9.30. The slurry is then poured into two Pyrex trays and is dried in an oven at 120° C. overnight, the mixture being stirred three times at 1½ hour intervals while it is being dried.

The dried mixture is then ground to pass a 20-mesh (Tyler) sieve and the ground particles are intimately admixed in a Simpson intensive mixer. At this point, the ground particles contain, on the average, 3 percent by weight of free moisture as measured by a Cenco moisture balance. 360 cc. of deionized water is added to the powder in the mixture, and mixing is then continued for a 15-minute period. At this point, the mixture contains 28.2 percent by weight of free moisture, as measured by the Cenco moisture balance. The mixture is then extruded to ⅛ inch diameter, and extrudate is dried at 140° C. for approximately 3 hours. Following this, the extrudate is broken up into ⅛ inch to ¼ inch lengths and is screened on a 12 mesh (Tyler) screen to remove fines. There is recovered 514 grams of dried, broken extrudate.

396 grams of the extrudate are charged to a 50 mm. outside diameter Vycor (fused silica) reactor, tabular alumina of 4–8 mesh (Tyler) being placed on each side of the extrudate in the reactor. The reactor is then placed in a radiant furnace and dried and calcined with air flowing at the rate of 400 liters per hour. During the drying and calcining, the temperature is gradually raised to 900° F. over a two-hour period. The catalyst is thereafter held at 900–930° F. for a further period of 3 hours with the air still flowing at the same rate. There is thus produced 279 grams of dried and calcined catalyst containing 3.31 weight percent of volatile matter at 1100° C. analyzing on an ignited weight basis approximately 0.44 weight percent rhodium and 0.69 weight percent fluorine.

30 grams of the dried and calcined catalyst prepared as just described is charged to a stainless steel pressure reactor having an inside diameter of one inch. The catalyst in the reactor is supported by glass wool and the catalyst is charged to the reactor in admixture with tabular alumina of 16–20 mesh (Tyler) size in the following manner. The layer immediately above the glass wool is composed of a mixture of 14.2 grams of the catalyst and 32.8 grams of tabular alumina. The next upper layer is composed of a mixture of 7.8 grams of the catalyst and 45.6 grams of the tabular alumina. Continuing in an upward direction, the four successive layers are composed of the following mixtures: 4.0 grams of catalyst and 53.1 grams of the tabular alumina, 2.2 grams of catalyst and 56.6 grams of the tabular alumina, 1.2 grams of catalyst and 58.6 grams of the tabular alumina and 0.6 gram of catalyst and 59.8 grams of the tabular alumina. The uppermost layer in the reactor is composed solely of 100 grams of tabular alumina.

After the reactor has been charged, it is then placed in vertical position (the highest concentration of catayst being at the bottom) in a bronze block furnace while the furnace is being purged with nitrogen gas. After this has been done, hydrogen gas flowing at the rate of three standard cubic feet per hour is then introduced into the top of the reactor until the pressure reaches 300 p.s.i.g. At the same time, the temperature is raised to 400° F. After this has been done, the temperature is further raised to 485° F., but at the same time hydrogen is purged from the bottom of the reactor at a rate such that when the temperature reaches 485° F. the pressure is 200 p.s.i.g. At this point, that is while the temperature is being maintained at 485° F. and the pressure at 200 p.s.i.g., hydrogen sulfide gas is passed into the top of the reactor while gas is being bled off in order that the pressure will remain at 200 p.s.i.g. The hydrogen sulfide, in admixture with hydrogen in the reactor, is introduced into the reactor over a period of five minutes during which time the temperature is in the approximate range of 475 to 510° F. After this has been done, the reactor is purged with hydrogen introduced into the top of the reactor while the pressure is still maintained at 200 p.s.i.g.

Still continuing the flow of hydrogen, the pressure is raised to 300 p.s.i.g. and the temperature to 575° F. At that point, normal pentane (99.44 mol percent purity) is introduced into the top of the reactor in admixture with the hydrogen. The rate of normal pentane feed is set so that the weight hourly space velocity, based upon normal petane feed is 5, and the flow of hydrogen is adjusted such that the molar ratio of hydrogen to normal pentane feed to the reactor is 5. The temperature of the reactor is then raised to 830° F. During a two-hour test, 55.1 percent of the normal pentane fed to the reactor is converted to the isopentane and 94.5 percent of the normal pentane destroyed is converted to isopentane. If the catalyst had not been treated with hydrogen sulfide, large amounts of methane would have been produced and control of temperature would have been difficult.

If desired, a catalyst of similar utility in isomerizing 4 to 12 carbon alkanes can be prepared by using straight run naphtha in place of hydrogen sulfide, providing the naphtha contains small amounts of sulfur compounds which sulfide the catalyst similarly to hydrogen sulfide. Also, the sulfur for the catalyst could be provided by sulfur compounds in the alkane feed. In general, in our method the catalyst contains from about 0.01 to 1% by weight of sulfur with about 0.01 to 0.1% being preferred. As indicated, this sulfur can be added by any method desired and examples of such are noted above. Other procedures could be used, for instance, an alumina hydrate could be mixed with rhodium chloride and the rhodium precipitated by addition of hydrogen sulfide. Calcination of the rhodium containing material in nitrogen will insure the retention of sufficient sulfur in the catalyst. If in the several methods of adding sulfur to the catalyst too much be included, the amount of sulfur can be reduced by purging with hydrogen. In continuous or semi-continuous processing, the catalyst can be regenerated by contact with oxygen and if the sulfur content is thereby reduced to an undesirable level, the catalyst can be resulfided.

*Example II*

A sulfided rhodium-alumina catalyst is prepared in essentially the same manner as the sulfided rhodium-alumina catalyst of Example I except that about 10 weight percent boria is substituted for the fluorine as the acidic promoter. The boria is added to a rhodium-alumina composite through dissolving the $H_3BO_3$ in deionized water by heating the water to boiling, pouring the hot boria solution over the rhodium-alumina catalyst to impregnate the catalyst, and drying the catalyst in a forced air drying oven set at about 284° F. for about 4 hours.

The following comparison serves to show that a sulfided rhodium-alumina catalyst, prepared essentially in the same manner as the catalyst of Example II and containing boria is superior to a sulfided platinum-boria-alumina catalyst.

| Cat. No. | Metal, Percent | Kind of Metal | $B_2O_3$, percent | Percent S |
|---|---|---|---|---|
| 30C | 0.54 | Pt | 9.9 | ~0.12 |
| 55R | 0.54 | Rh | 11.0 | ~0.15 |

PENTANE CONVERSION TO ISOPENTANE
[Conditions 300 p.s.i.g., 750° F.]

| Cat. No. | Activity Constant | Percent Conversion per pass | Ult., Yields, $C_1$-$C_4$ | Wt. Percent $iC_5+$ |
|---|---|---|---|---|
| 30C | 1.5 | 54 | 10.1 | 89.9 |
| 55R | 2.9 | 62 | 0.6 | 99.4 |

Thus, conversion to isopentane and especially freedom from cracking loss are much superior in the rhodium catalyst than in the platinum catalyst.

This application is a continuation-in-part of application Serial No. 618,696, filed October 29, 1956, now abandoned.

We claim:

1. In the isomerization of alkanes containing from four to twelve carbon atoms to introduce branching into their structure, the step which comprises contacting the feedstock with a sulfided rhodium supported on alumina catalyst containing a minor amount of boria at an elevated temperature of about 650° F. to 1000° F., a pressure of about 200 p.s.i.g. to 1000 p.s.i.g., a hydrogen to alkane molar ratio of about 1:1 to 20:1, and a weight hourly space velocity of 0.5 to 20.

2. The method of claim 1 wherein the feedstock is an alkane containing from 4 to 6 carbon atoms.

3. The method of claim 1 wherein the feedstock is normal pentane.

4. The method of claim 1 wherein the feedstock is normal butane.

5. The method of claim 1 wherein the feedstock is normal hexane.

6. In the isomerization of normal alkanes containing from four to twelve carbon atoms to introduce branching into their structure, the step which comprises contacting the feedstock with a sulfided rhodium supported on alumina catalyst containing from about 5 to 20 weight percent of boria at an elevated temperature of about 650° F. to 1000° F., a pressure of about 200 p.s.i.g. to 1000 p.s.i.g., a hydrogen to alkane molar ratio of about 1:1 to 20:1, and a weight hourly space velocity of 0.5 to 20.

7. The method of claim 6 wherein the feedstock is an alkane containing from 4 to 6 carbon atoms.

8. A catalyst composition consisting essentially of rhodium supported on alumina containing a minor amount of boria, the rhodium amounting to from about 0.01 to about 2 percent by weight of said composition and said composition having been prepared by contacting a calcined rhodium-boria-alumina catalyst with hydrogen sulfide gas at a temperature of 70° F. to 1000° F. and at a pressure of 0 p.s.i.g. to 100 p.s.i.g.

9. A catalyst composition consisting essentially of rhodium supported on alumina containing from about 5 to 20 weight percent of boria, the rhodium amounting to from about 0.01 to about 2 percent by weight of said composition and said composition having been prepared by contacting a calcined rhodium-boria-alumina catalyst with hydrogen sulfide gas at a temperature of 70° F. to 1000° F. and at a pressure of 0 p.s.i.g. to 100 p.s.i.g.

References Cited in the file of this patent

UNITED STATES PATENTS

| | | |
|---|---|---|
| 2,698,829 | Haensel | Jan. 4, 1955 |
| 2,766,302 | Elkins | Oct. 9, 1956 |
| 2,834,740 | Johnson et al. | May 13, 1958 |
| 2,925,453 | Folkins et al. | Feb. 16, 1960 |
| 2,951,887 | Folkins et al. | Sept. 6, 1960 |
| 2,952,721 | Thomas et al. | Sept. 13, 1960 |